United States Patent
Huh et al.

(10) Patent No.: US 9,966,087 B1
(45) Date of Patent: May 8, 2018

(54) COMPANION DEVICE FOR PERSONAL CAMERA

(71) Applicant: Verizon Patent and Licensing Inc., Arlington, VA (US)

(72) Inventors: Gabriel H. Huh, Somerville, NJ (US); Matthew Scott Deatrick, Oak Ridge, NJ (US); Denise N. Lyn-Shue, Cambridge, MA (US); Andrew Nicholas Toth, Telford, PA (US); Mauricio Pati Caldeira De Andrada, South Plainfield, NJ (US); Bing Qiu, Bridgewater, NJ (US); Sidharth R. Sibal, Martinsville, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days. days.

(21) Appl. No.: 15/338,995

(22) Filed: Oct. 31, 2016

(51) Int. Cl.
| | |
|---|---|
| *G10L 21/02* | (2013.01) |
| *G10L 21/0272* | (2013.01) |
| *H04W 4/02* | (2018.01) |
| *H04L 29/06* | (2006.01) |
| *G10L 21/0264* | (2013.01) |
| *H04W 92/18* | (2009.01) |
| *H04W 84/12* | (2009.01) |

(52) U.S. Cl.
CPC ...... *G10L 21/0272* (2013.01); *G10L 21/0264* (2013.01); *H04L 65/4069* (2013.01); *H04W 4/02* (2013.01); *H04W 84/12* (2013.01); *H04W 92/18* (2013.01)

(58) Field of Classification Search
CPC .................. G10L 21/0272; G10L 21/0208
USPC ........................................................ 704/226
See application file for complete search history.

(56) References Cited

U.S. PATENT DOCUMENTS

| | | | | |
|---|---|---|---|---|
| 8,997,167 B1* | 3/2015 | Bliss | .................. | H04N 21/4223 725/115 |
| 2009/0323925 A1* | 12/2009 | Sweeney | ................. | H04M 9/08 379/406.05 |
| 2012/0057716 A1* | 3/2012 | Chang | .................. | G10K 11/178 381/71.1 |
| 2012/0087510 A1* | 4/2012 | Sampimon | ........... | H04R 1/1083 381/74 |
| 2012/0211563 A1* | 8/2012 | Gannon | .............. | H04M 1/7253 235/437 |
| 2014/0168354 A1* | 6/2014 | Clavel | .................... | H04N 7/152 348/14.09 |
| 2015/0314454 A1* | 11/2015 | Breazeal | ................ | B25J 9/0003 700/259 |
| 2016/0149547 A1* | 5/2016 | Rider | ....................... | H03G 3/04 381/57 |

(Continued)

*Primary Examiner* — Jakieda Jackson

(57) ABSTRACT

A method that may be performed by a device may include receiving, from a personal camera, streaming content via a first WiFi interface. The method may include receiving a vocal instruction regarding the streaming content. The method may include determining configuration information based on which to modify or provide the streaming content. The configuration information may be determined based on one or more of: location information associated with the device, or the vocal instruction. The method may include modifying the streaming content, to obtain modified streaming content, based on the configuration information. The method may include providing the modified streaming content via a second WiFi interface.

20 Claims, 7 Drawing Sheets

(56) References Cited

U.S. PATENT DOCUMENTS

| | | | |
|---|---|---|---|
| 2016/0165338 A1* | 6/2016 | Benattar | H04R 1/406 |
| | | | 381/92 |
| 2016/0212327 A1 | 7/2016 | Dietel et al. | |
| 2016/0367891 A1* | 12/2016 | Trehan | A63F 13/213 |
| 2017/0085774 A1* | 3/2017 | Majumdar | H04N 5/23206 |
| 2017/0086050 A1* | 3/2017 | Kerning | H04W 4/22 |
| 2017/0104928 A1* | 4/2017 | Chase | H04N 5/77 |
| 2017/0195550 A1* | 7/2017 | Kim | G06F 3/0483 |

\* cited by examiner

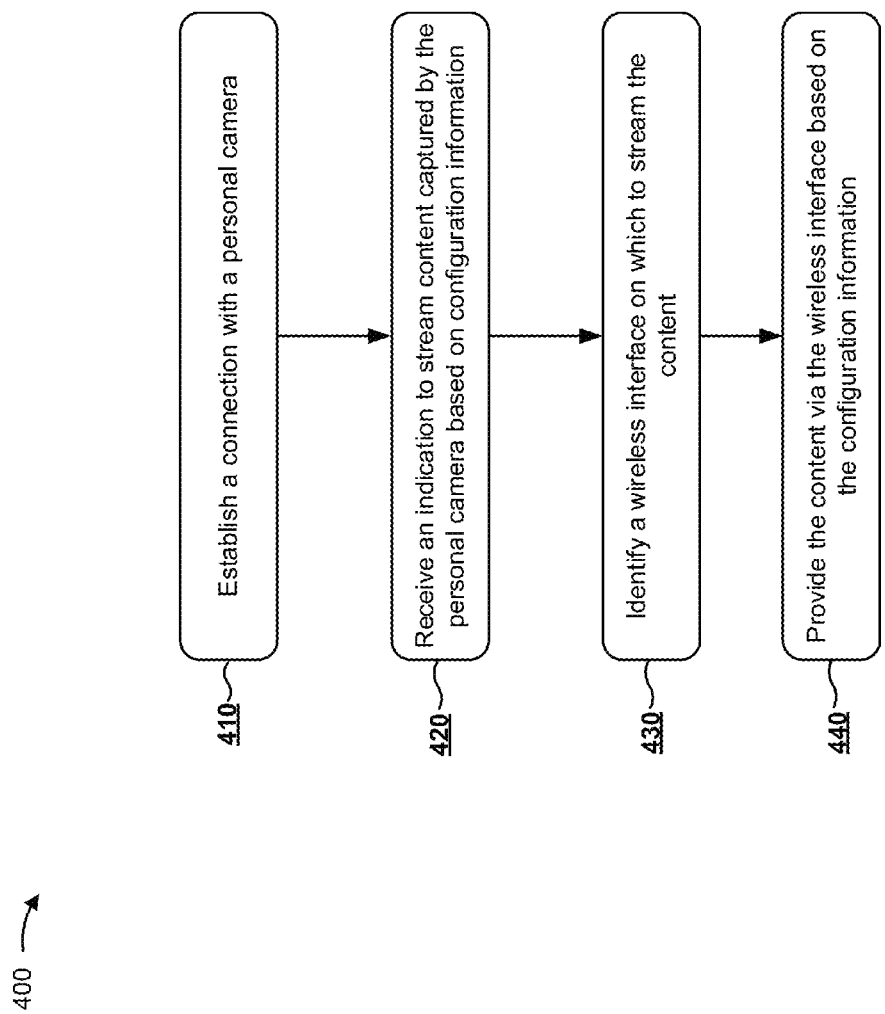

COMPANION DEVICE FOR PERSONAL CAMERA

BACKGROUND

A personal camera may include a camera device capable of capturing content (e.g., an image, a series of images, a video, audio, etc.). In some cases, the personal camera may be worn by a user (e.g., on a wrist, on a helmet, on a harness, etc.) and/or mounted on an object (e.g., a snowboard, a surfboard, a vehicle, etc.).

BRIEF DESCRIPTION OF THE DRAWINGS

FIG. 4 is a flow chart of an example process for streaming content based on configuration information.

DETAILED DESCRIPTION OF PREFERRED EMBODIMENTS

Figure 1A:
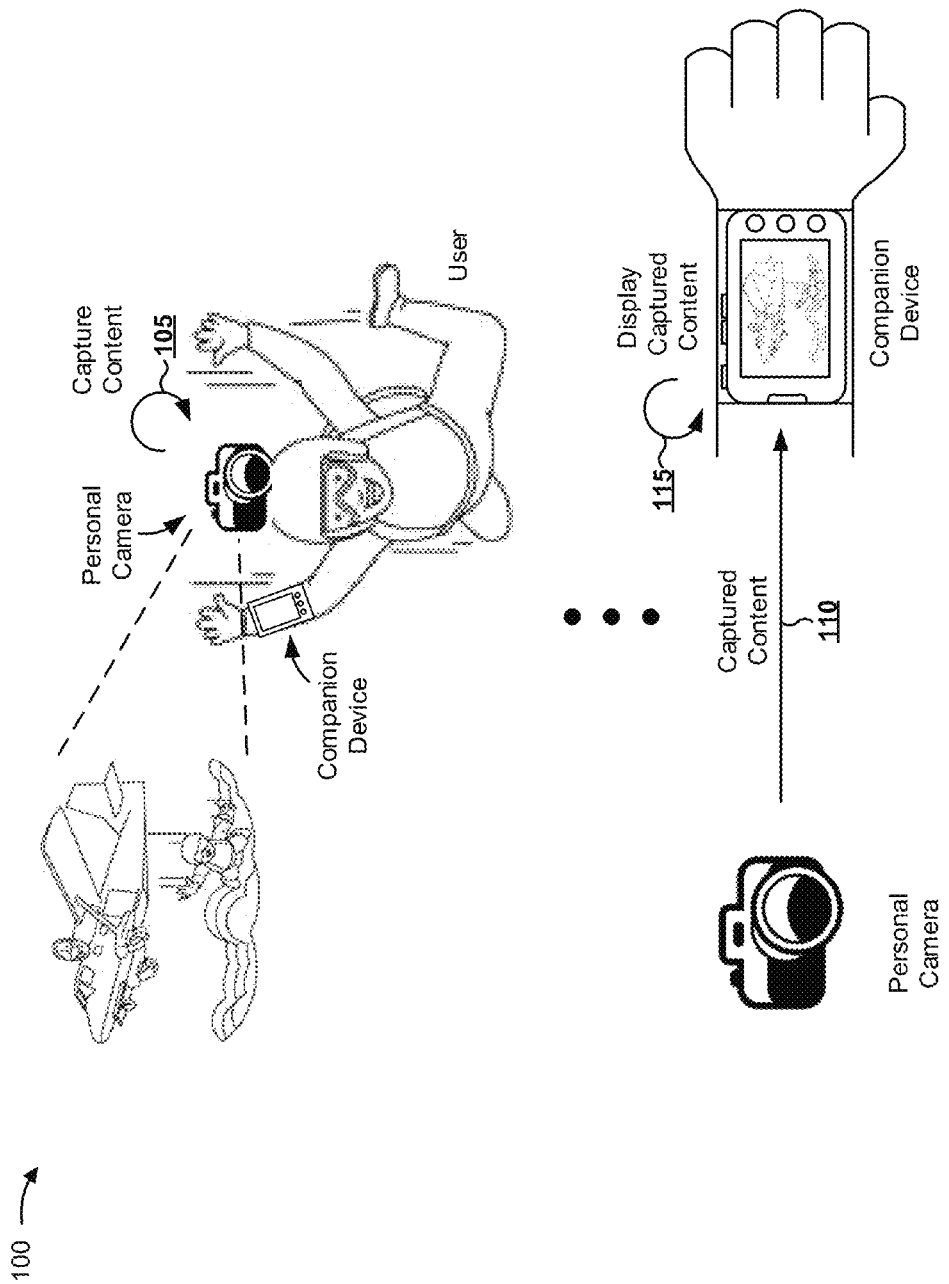
FIGS. 1A to 1D are diagrams of an overview of an example implementation described herein.

The following detailed description of example implementations refers to the accompanying drawings. The same reference numbers in different drawings may identify the same or similar elements.

A user may wear and/or mount a personal camera (e.g., a mobile personal camera) in order to capture content (e.g., an image, a series of images, a video, audio, etc.) associated with an activity (e.g., surfing, biking, rock climbing, etc.). Traditionally, the user may view, upload (e.g., to the Internet), and/or share (e.g., via social media) the content at a later time (i.e., after the activity being captured is over). Some companion devices (e.g., a device that has a user interface permitting configuration of streaming content, such as a smart phone, tablet, laptop, etc.) may provide wireless or cellular connectivity to upload or share the content as the content is captured. For example, a companion device may connect with the personal camera (e.g., via a wireless local area network connection, such as WiFi, a personal area network (PAN) connection, such as Bluetooth, a cell network, a satellite communication network, or a similar connection).

The companion device may provide content to a server, social media site, or the like. Uploading a video may use significant wireless bandwidth of the companion device, which may interfere with browsing or other activities to be performed by the companion device. Further, the companion device may be operated based on vocal instructions, which may be problematic in loud environments. Still further, it may be advantageous to share video with entities located nearby (e.g., companion devices, viewing devices, or local server devices that are within a particular distance of the companion device), for example, to streamline sharing of videos.

Implementations, described herein, may include a companion device with a dual-band wireless transceiver and multiple audio input components. As described herein, the dual-band wireless transceiver can be used to transmit streaming content on one wireless band, and to transmit/receive other content on another wireless band. In this way, throughput and audio/video quality of streaming content is improved. Further, the dual-band wireless transceiver may provide connections to multiple, different access points and/or radio access networks (e.g., a first access point associated with a first wireless network and a second access point associated with a second wireless network, two or more radio access networks of different types, etc.). In this way, cost and/or cellular network resources used for streaming video may be reduced, and performance of wireless streaming using the companion device is improved.

As described herein, a primary audio input component, of the multiple audio input components, may receive vocal instructions, and may filter ambient noise based on an audio signature received by a secondary audio input component. For example, the primary audio input component may be situated near a source of the vocal instruction (e.g., a mouth of a user), and the second audio input component may be situated more distant from the source of the vocal instruction. In this way, recognition of vocal instructions in situations with loud ambient noise may be improved.

In some implementations, a geographic location (e.g., geolocation) component may be provided to enable location-based features. For example, videos may be shared with companion devices or viewing devices located nearby (e.g., as determined based on social media accounts associated with the nearby companion devices or viewing devices, or based on location information associated with the nearby companion devices or viewing devices indicating that the nearby companion devices are within a particular distance of the companion device). In this way, configuration of the companion device and/or the personal camera based on location or ambient information associated with the location may be enabled. For example, the companion device may use a particular configuration based on a location of the companion device, may apply particular post-processing to content captured by the personal camera based on the location to generate modified streaming content, or the like.

FIGS. 1A to 1D are diagrams of an overview of an example implementation 100 described herein. For the purposes of example implementation 100, assume that a companion device is capable of communicating (e.g., via Bluetooth, via WiFi, via near field communication (NFC), etc.) with a personal camera associated with a user.

As shown in the upper portion of FIG. 1A, in some implementations, the personal camera may be worn by the user on, for example, a wrist, a helmet, a harness, or the like. Additionally, or alternatively, the personal camera may be mounted elsewhere, such as on a vehicle, a surfboard, a stationary object, or the like. As further shown, the companion device may also be worn by the user and/or may be located near the user (e.g., such that the user may view and/or interact with the companion device). As shown, assume that the user, while wearing the personal camera and the companion device, is participating in an activity (shown as skydiving).

As shown by reference number 105, the personal camera may capture content during the activity, such as an image, a series of images, a video, audio, or the like. In some implementations, the personal camera may capture the content based on an indication provided via the companion device. For example, the companion device may receive user input (e.g., touch input, voice input, etc.) indicating that the personal camera is to begin capturing the content, and may communicate with the personal camera to cause the personal camera to begin capturing the content, accordingly. In some implementations, the indication may be associated with recording a video, streaming a video, capturing an image, capturing audio, streaming audio, or the like.

As shown in the lower portion of FIG. 1A, and by reference number 110, the personal camera may provide the captured content to the companion device (e.g., in real-time, in near real-time, as the content is being captured, immediately after capturing the content, etc.). As shown by reference number 115, the companion device may receive the captured content, and may display the captured content via a display screen of the companion device.

Figure 1B:
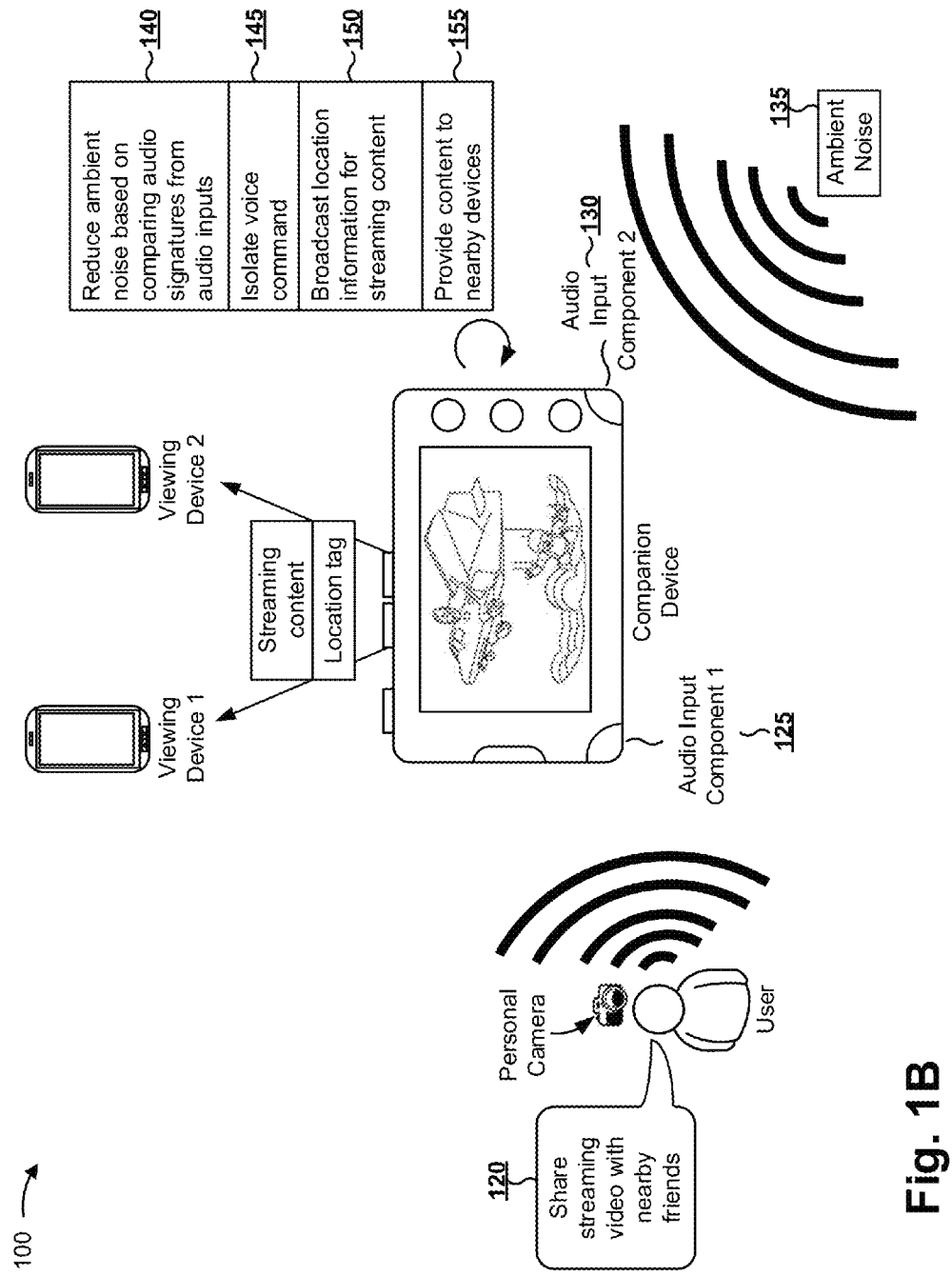

As shown by reference number 120 in FIG. 1B, a user may speak a vocal instruction that may be received by a first audio input component (e.g., audio input component 1) of the companion device (as shown by reference number 125). As shown in FIG. 1B, the vocal instruction may include an instruction to share a streaming video with devices located nearby (e.g., within a particular distance of the companion device). A second audio input component of the companion device (e.g., audio input component 2) may receive ambient noise 135. As shown by reference number 140, the companion device may reduce ambient noise using active noise cancellation based on comparing audio signatures from the first audio input component and the second audio input component in order to isolate the voice command (as shown by reference number 145).

As shown by reference number 150, the companion device may broadcast an indication to nearby viewing devices that the companion device is streaming content (e.g., in accordance with the vocal instruction). For example, the viewing devices may identify nearby companion devices based on location information associated with the companion devices. This location information may be provided by the companion devices to a server device (e.g., a streaming server), and the server device may provide the location information to the nearby viewing devices. As shown by reference number 155, the companion device may provide the streaming content to the viewing devices (e.g., via the server device). For example, the companion device may provide a message to the viewing devices (e.g., a text message, an email message, a social media message, etc.) that identifies a link for accessing the streaming content, and the server device may provide the streaming content based on the viewing devices accessing the link. In some implementations, the companion device may also provide a location tag identifying a location of the companion device. In some implementations, the companion device may overlay the location tag onto the streaming content or embed the location tag into the streaming content. For example, the companion device may embed a location tag into audio content (e.g., may include verbal location information in the audio content).

Figure 1C:
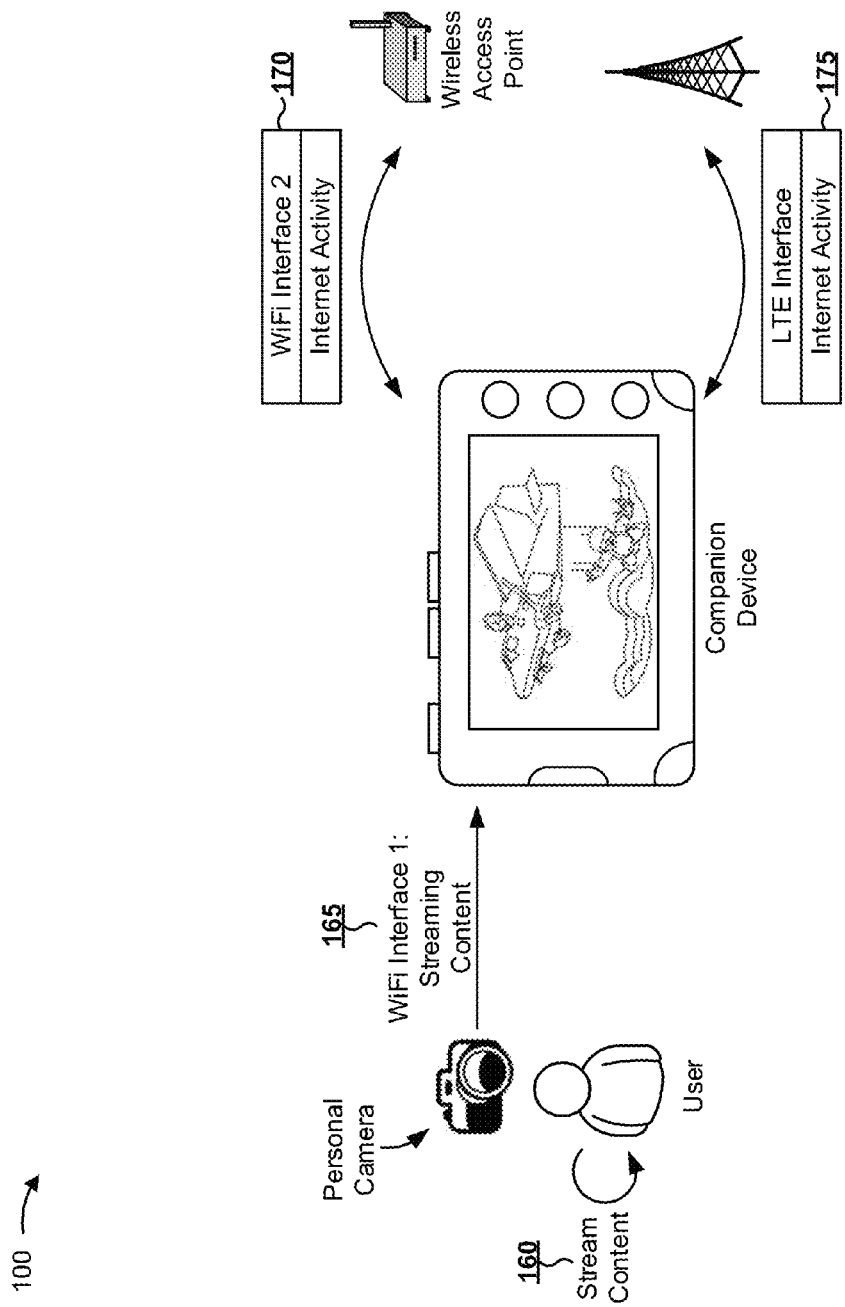

As shown in FIG. 1C, and by reference number 160, the companion device may receive input to cause the companion device to stream streaming content associated with the personal camera, and may receive the streaming content to be streamed from the personal camera via a first WiFi interface, as shown by reference number 165. As shown by reference number 170, in some cases, the streaming content and/or other Internet activity may be transmitted via a second WiFi interface (e.g., a WiFi interface associated with a different WiFi band than WiFi interface 1). For example, the companion device may perform the Internet activity via the second WiFi band when a connection via the second WiFi band is available. As shown by reference number 175, in other cases, network traffic associated with Internet activity may be transmitted via a LTE interface. For example, when a connection via the second WiFi interface is not available, the companion device may provide the network traffic associated with the Internet activity via the LTE interface. In this way, the companion device conserves data cost and LTE bandwidth by using a WiFi interface when available, and improves versatility of the companion device by using an LTE interface when the WiFi interface is not available.

Figure 1D:
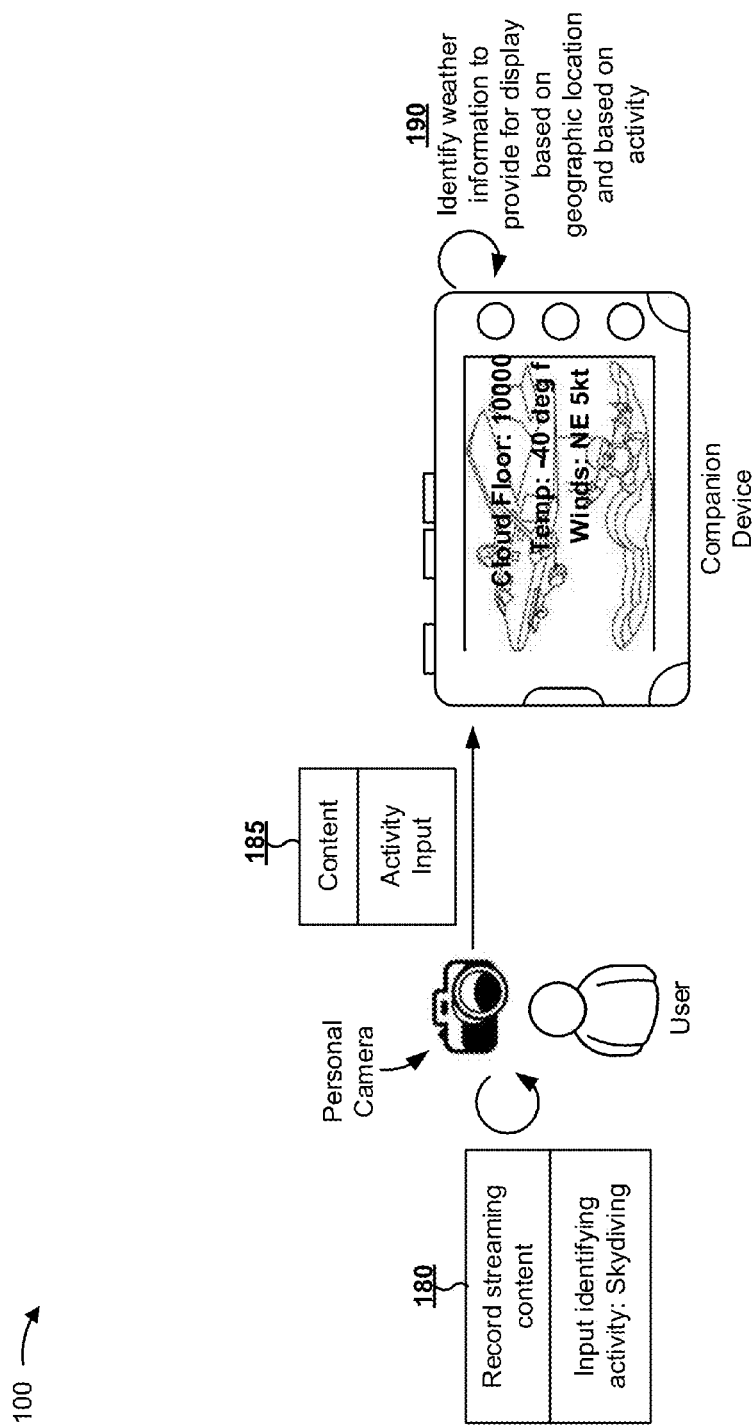

FIG. 1D is an example of modifying streaming content based on information identifying an activity associated with the streaming content and a location associated with the streaming content. As shown by reference number 180 in FIG. 1D, a personal camera may record streaming content. As further shown, a user associated with the personal camera may provide input (e.g., to the companion device based on a vocal or manual instruction) that identifies an activity associated with the streaming content (e.g., skydiving). As shown by reference number 185, the companion device may receive the content to be streamed and the input regarding the activity.

Based on the streaming content and the activity, the companion device may identify information to be added to the streaming content. For example, the companion device may identify the information to be added based on the geographic location of the companion device and based on the activity. For example, here, the companion device adds weather information to the streaming content that identifies weather conditions that are relevant to the activity (e.g., a cloud floor of 10000 feet, a temperature of −40 degrees Fahrenheit, and a wind vector of 5 knots northeast).

In some implementations, the companion device may configure the personal camera based on the activity profile. For example, when the activity includes skydiving, skateboarding, or the like, the companion device may configure the personal camera for an anti-shake configuration. As another example, when the activity includes an indoor activity, the companion device may configure the personal camera for a low light image capture configuration.

In this way, a companion device streams content via multiple, different wireless bands or interfaces (e.g., a WiFi interface and an LTE interface), which reduces delay and cost of streaming the content. Further, the companion device can receive audible input via a first audio input component and a second audio input component, which permits active cancellation of unwanted noise based on comparing inputs received via the first audio input component and the second audio input component. Still further, the companion device can modify streaming content or perform other configuration actions based on geolocation information provided by a geolocation component of the companion device.

As indicated above, FIGS. 1A-1D are provided merely as an example. Other examples are possible and may differ from what was described with regard to FIGS. 1A-1D.

Figure 2:
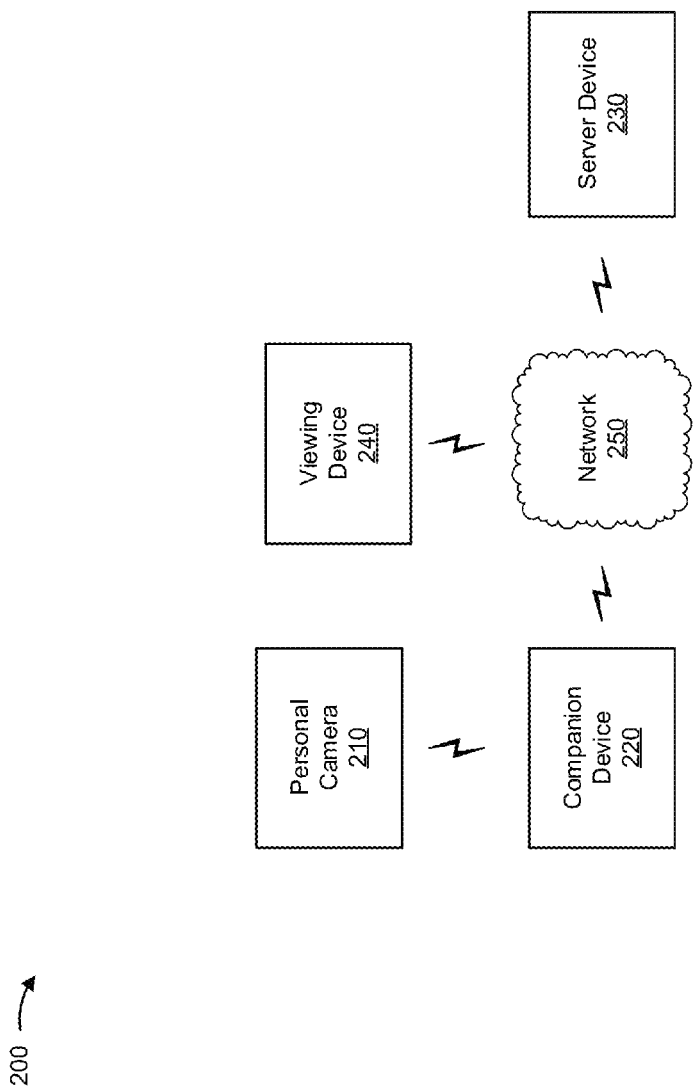
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a personal camera 210, a companion device 220, a server device 230, a viewing device 240, and a network 250. Devices of environment 200 may interconnect via wired connections, wireless connections, or a combination of wired and wireless connections.

Personal camera 210 includes a camera device capable of capturing, providing, and/or storing content. For example, personal camera 210 may include a GoPro personal camera or another type of personal camera. While this description may refer to a GoPro personal camera as an example of a personal camera 210, personal camera 210 may correspond to other types of personal cameras, such as personal cameras made by Sony, Garmin, Drift, or the like.

Companion device 220 includes a device capable of causing content, captured by personal camera 210, to be displayed, uploaded, shared, and/or streamed (e.g., in real-time relative to the capturing of the content, in near real-time relative to the capturing of the content, etc.) to one or more devices via network 250. For example, companion device 220 may include a device capable of streaming the content, via an LTE network, via a Wi-Fi network, etc., to one or more server devices 230 (e.g., such that the content may be viewed in real-time, in near real-time, etc. via one or more viewing devices 240).

In some implementations, companion device 220 may include a wearable device capable of wirelessly communicating with personal camera 210 (e.g., via a Bluetooth connection, via a WiFi network, etc.). In some implementations, companion device 220 may be capable of controlling (e.g., initiating recording, initiating streaming, powering-on, etc.) personal camera 210 based on user input (e.g., via a touch screen, based on vocal instructions, etc.) received by companion device 220. Additionally, or alternatively, companion device 220 may be capable of displaying the content captured by personal camera 210. In some implementations, companion device 220 may include multiple audio input components (e.g., two audio input components). For example, a first audio input component may be situated to receive vocal instructions from a user at a higher intensity than a second audio input component, and the second audio input component may be situated to receive ambient sound at substantially equal intensity to the first audio input component (e.g., the audio input components may be provided on opposite sides of companion device 220, or one audio input may be on an armband of companion device 220, etc.). As used herein, substantially equal intensity or volume may refer to a difference in intensity or volume that is less than or equal to approximately one decibel, five decibels, ten decibels, or a similar difference.

Server device 230 includes one or more devices that receive content from companion device 220 and cause the content to be provided (e.g., displayed, uploaded, shared, streamed, etc.) to one or more other devices. For example, server device 230 may include a server device or a group of server devices. In some implementations, server device 230 may host a streaming application, a streaming video channel, a social media application, a website, or the like, associated with displaying, uploading, sharing, and/or streaming the content and/or information associated with the content. In some implementations, server device 230 may be associated with a cloud storage environment that stores streaming content that is captured by personal camera 210. In some implementations, server device 230 may include a streaming server to provide streaming content to one or more other devices via network 250.

Viewing device 240 includes a device capable of providing content for display to a viewer. For example, viewing device 240 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set top box, a smart television, or the like. In some implementations, viewing device 240 may have access to server device 230 that hosts a streaming application and/or a social media application via which the content is streamed and/or shared.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
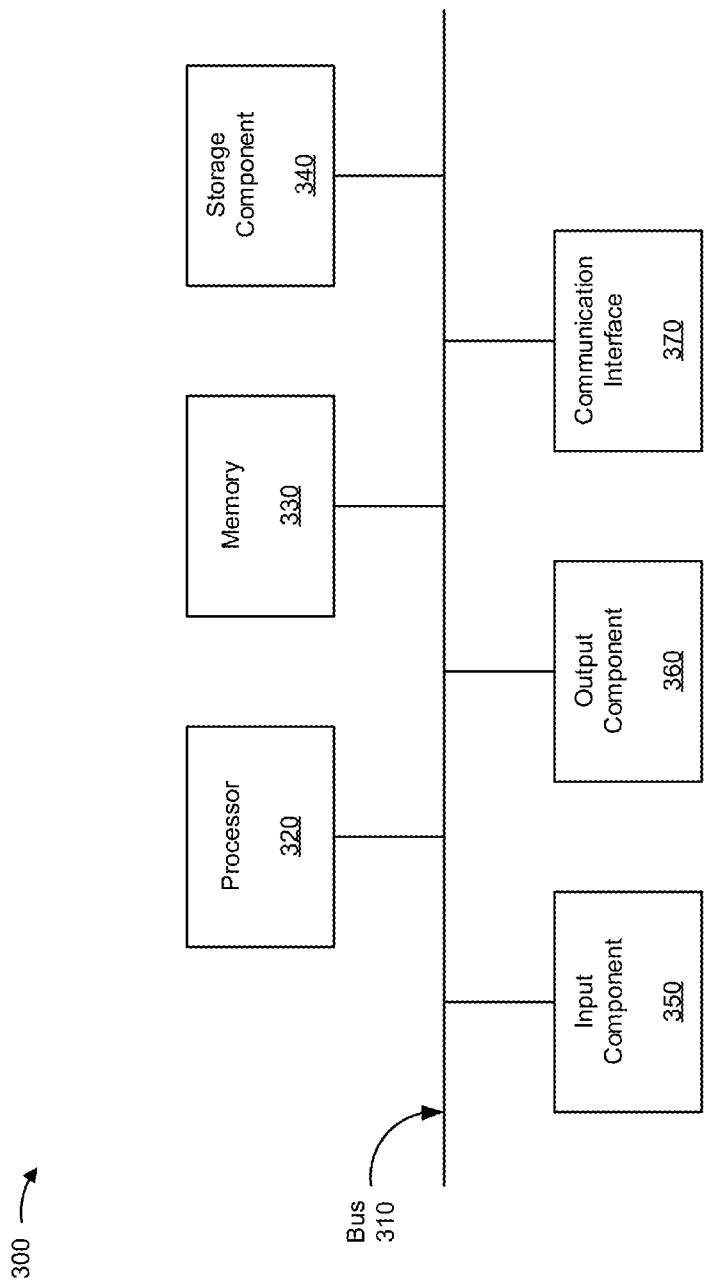
FIG. 3 is a diagram of example components of one or more devices of FIG. 2.

FIG. 3 is a diagram of example components of a device 300. Device 300 may correspond to personal camera 210, companion device 220, server device 230, and/or viewing device 240. In some implementations, personal camera 210, companion device 220, server device 230, and/or viewing device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for streaming content based on configuration information. In some implementations, one or more process blocks of FIG. 4 may be performed by companion device 220. In some implementations, one or more process blocks of FIG. 4 may be performed by another device or a group of devices separate from or including companion device 220, such as personal camera 210, server device 230, and viewing device 240.

As shown in FIG. 4, process 400 may include establishing a connection with a personal camera (block 410). For example, companion device 220 may establish a connection with personal camera 210. Companion device 220 may establish the connection after powering-on, after receiving a user interaction to cause companion device 220 to establish the connection, after detecting that personal camera 210 is within connection range, etc. In some implementations, companion device 220 may search for and discover/detect personal camera 210 (e.g., when personal camera 210 is placed in a "pairing" or "discoverable" mode and companion device 220 detects WiFi or Bluetooth pairing signals transmitted by personal camera 210 in pairing or discoverable mode). In some implementations, companion device 220 may provide a notification that identifies the detection of personal camera 210 to permit a user to specify whether companion device 220 is to connect to personal camera 210 (e.g., based on discovering personal camera 210 as described above).

In some implementations, companion device 220 may establish the connection via a wireless interface. For example, companion device 220 may be associated with a first wireless interface (e.g., a WiFi interface for receiving and/or providing Internet traffic), and a second wireless interface (e.g., an LTE interface for receiving and/or providing Internet traffic). In some implementations, companion device 220 may include a third wireless interface for establishing a connection with personal camera 210 and receiving streaming content from personal camera 210 (e.g., a WiFI and/or Bluetooth interface). Companion device 220 may receive and/or provide streaming content and/or Internet content via the WiFi interface when a WiFi connection is available, and may provide the streaming content and/or Internet content via the LTE interface when the WiFi connection is not available. In this way, data cost and usage associated with companion device 220 are reduced.

In some implementations, the first wireless interface (e.g., the WiFi interface for receiving and/or providing Internet traffic) and the third wireless interface (e.g., the WiFi interface for connecting with personal camera 210) may be associated with different bands of the WiFi spectrum. For example, the first wireless interface may be associated with a band in the 5 GHz range of the wireless spectrum, and the third wireless interface may be associated with a band in the 2.4 GHz range of the wireless spectrum.

As further shown in FIG. 4, process 400 may include receiving an indication to stream content captured by the personal camera based on configuration information (block 420). For example, companion device 220 may receive an indication to stream content captured by personal camera 210. In some implementations, companion device 220 may stream the content based on configuration information. The configuration information may include information associated with a manner in which content (e.g., an image, a series of images, a video, audio, etc.), captured by personal camera 210, is to be displayed, uploaded, shared, and/or streamed by companion device 220. In some implementations, companion device 220 may receive the configuration information based on a user interaction with an interface provided by companion device 220, or based on a vocal instruction received from a user. In some implementations, companion device 220 may obtain configuration information based on establishing a connection with personal camera 210.

The configuration information may include or identify location information that identifies a location of companion device 220 (e.g., location information that may be obtained based on a geolocation component of companion device 220 and/or user input). Additionally, or alternatively, the configuration information may include or identify activity information that identifies an activity associated with the content (e.g., a sport, a physical activity, an event, etc.). Additionally, or alternatively, the configuration information may include or identify one or more wireless bands on which to stream the content and/or perform other Internet-based activity, one or more viewing devices 240 to receive the streaming content, or the like.

In some implementations, the configuration information may include information associated with a social media application and/or a streaming application via which the content is to be displayed, uploaded, shared, and/or streamed. For example, the configuration information may include information that identifies the social media application and/or the streaming application, such as a name, an identification number, an address (e.g., a uniform resource locator (URL), an Internet protocol (IP) address, etc.), or the like. As another example, the configuration information may include login information for a user account associated with the social media application and/or the streaming application, such as a username, a password, or the like.

As yet another example, the configuration information may include information indicating whether the social media application and/or the streaming application is a default social media application and/or a default streaming application (e.g., when the configuration information includes information associated with multiple social media applications and/or multiple streaming applications). As an additional example, the configuration information may include information associated with a message to be displayed via the social media application, such as a message that may be posted to the user's social media account to inform other users of the social media application that the content is being displayed, uploaded, shared, and/or streamed via the streaming application and/or the social media application. In some implementations, the configuration information may include information associated with multiple social media applications and/or multiple streaming applications (e.g., such that the content may be displayed, uploaded, shared, and/or streamed via the multiple social media applications and/or the multiple streaming applications).

In some implementations, companion device 220 may determine the configuration information automatically and based on a location of companion device 220. For example, companion device 220 may determine that companion device 220 is located at a beach, and may select a beach-related activity and/or present a user interface identifying beach-related activities (e.g., to permit a user to select a beach-related activity). Based on the selected activity, companion device 220 may determine configuration information (e.g., post-processing to perform on content, information to overlay on or embed in the content, camera settings for capturing the content, devices to which to provide the content, etc.).

In some implementations, viewing device 240 may identify nearby companion devices 220, that are located within a particular distance of viewing device 240, to receive streaming content from the companion device 240. For example, viewing device 240 may identify a nearby companion device 220 based on location information associated with the nearby companion device 220 (e.g., obtained from server device 230), and based on location information associated with viewing device 240. When viewing device 240 is within a particular distance of companion device 220 (e.g., ten meters, fifty meters, one kilometer, etc.), viewing device 240 may identify companion device 220 as a nearby companion device 220.

In some implementations, companion device 220 may relay information to another device (e.g., another companion device 220, a server device 230, a viewing device 240, etc.) via an intermediate device. For example, companion device 220 may receive information from the intermediate device that identifies the other device. The other device may be located within data transmission range of the intermediate device and not the other device. In such a case, companion device 220 may provide streaming content to the intermediate device, and the intermediate device may provide the streaming content to the other device (e.g., via WiFi, Bluetooth, NFC, etc.). In this way, an effective data transmission range of companion device 220 is increased without using costly cellular data.

In some implementations, companion device 220 may determine the configuration information based on a vocal instruction. In some implementations, companion device 220 may receive the vocal instruction via a first audio input component (e.g., audio input component 1 of FIG. 1B). Companion device 220 may include a second audio input component (e.g., audio input component 2 of FIG. 1B) that may receive noise (i.e., sound other than (or in addition to) the audio user input, such as ambient noise, wind noise, speech from surrounding individuals, etc.). Companion device 220 may use signals obtained by the first audio input component and the second audio input component to reduce or eliminate the ambient noise, thus improving accuracy of detection of the audio user input.

In some implementations, companion device 220 may perform active noise cancellation or active noise reduction based on the signals received by the first audio input component and the second audio input component. For example, both audio input components may receive the noise, and the first audio input component may receive the audio user input. Additionally, or alternatively, the first audio input component may receive the audio user input at a louder volume or a higher intensity than the second audio input component. Companion device 220 may cancel or reduce signals received via both audio input components. For example, companion device 220 may identify noise that is received at substantially equal volume or intensity by the first audio input component and the second audio input component, and may generate a destructive interference signal to reduce or cancel the noise. In this way, accuracy of audio user input in situations with ambient noise is improved.

As further shown in FIG. 4, process 400 may include identifying a wireless interface on which to stream the content (block 430). For example, companion device 220 may be associated with two or more wireless interfaces. Companion device 220 may select a wireless interface on which to stream the content. For example, when a WiFi interface is available on which to stream the content and/or receive and/or provide Internet content, companion device 220 may use the WiFi interface. When the WiFi interface segment information not available, companion device 220 may use the LTE interface. In some implementations, companion device 220 may simultaneously receive and/or provide streaming and/or Internet content via a first WiFi interface (e.g., a WiFi interface associated with a 5 GHz band of the WiFi spectrum) and communications with personal camera 210 via a second WiFi interface (e.g., a WiFi interface associated with a 2.4 GHz band of the WiFi spectrum). In some implementations, companion device 220 may determine whether to use a WiFi band or an LTE band (e.g., based on data cost associated with the WiFi band and the LTE band, based on video quality requirements and/or bandwidth requirements, etc.).

As further shown in FIG. 4, process 400 may include providing the content via the wireless interface based on the configuration information (block 440). For example, companion device 220 may provide or stream the content via the wireless interface based on the configuration. In some implementations, companion device 220, or another device (e.g., server device 230) may modify the content based on the configuration information. As one example, companion device 220 or server device 230 may downsample video or audio content based on the wireless interface via which the video or audio content is to be provided (e.g., based on a type of wireless interface via which the video or audio content is to be provided). In this way, bandwidth usage and data cost associated with streaming content may be reduced.

In some implementations, companion device 220 may modify the content by adding information to the content. For example, companion device 220 may add weather information that identifies weather conditions near companion device 220. The weather information may be based on a location and/or activity associated with the content, and may be relevant to the location and/or activity. For example, if companion device 220 is located near a hiking area, companion device 220 may add weather information to the content that is relevant to hiking. In some implementations, companion device 220 may include one or more sensors capable of determining the weather information, and may determine the weather information based on the one or more sensors. Additionally, or alternatively, companion device 220 may obtain the weather information from another device (e.g., server device 230, an Internet weather service, etc.). In this way, processor and bandwidth resources that would otherwise be used to manually obtain such information may be conserved.

In some implementations, companion device 220 may provide the content based on a geographic location of companion device 220. For example, companion device 220 may provide the content to particular viewing devices 240 that are located within a particular distance of companion device 220 and/or to a local server device 230. In some implementations, companion device 220 may overlay a geographical filter on the streaming content. In some implementations, companion device 220 may provide information via a user interface of companion device 220 (e.g., weather information based on a location or activity associated with the content). In some implementations, the information may be provided to devices to which the content is being streamed (e.g., another companion device 220, viewing device 240, etc.).

In some implementations, information regarding other activities that can be performed at a nearby location (e.g., a location within a particular distance) may be provided. This information may be determined based on other companion devices 220. For example, other users associated with the other devices may identify activities associated with the other companion devices 220. Companion device 220 may provide a user interface that identifies activities within a particular distance of companion device 220 (e.g., ten meters, one hundred meters, one kilometer, etc.), and locations associated with the activities. For example, companion device 220 may determine that a whitewater rafting area is located within the particular distance of companion device 220 based on information provided to the other companion devices 220 indicating that users associated with the other companion devices 220 are whitewater rafting. In some implementations, the user interface may provide streaming content relevant to the activities. For example, companion device 220 may obtain streaming content from the other companion devices 220, and may provide the streaming content in association with the information identifying the activities. In some implementations, the information described above may be provided to server device 230, and server device 230 may store, provide, and/or route the information to other companion devices 220, which conserves processor and network resources of companion devices 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As described herein, companion device 220 may include multiple audio inputs to aid in the cancelling of ambient noise to improve voice command recognition (e.g., particularly in noisy, active, and/or outdoor environments in which a significant amount of ambient noise may be present). Additionally, or alternatively, companion device 220 may transmit different types of data via multiple different wireless bands to more efficiently transmit traffic in an economical manner.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a first audio input component and a second audio input component;
a first wireless interface and a second wireless interface,
the first wireless interface to receive streaming content from a personal camera,
the personal camera to capture content during an activity,
the content including at least one of:
an image,
a series of images,
a video, or
audio, and
the second wireless interface to receive or provide Internet traffic including the streaming content;
a geolocation component; and
one or more processors to:
identify location information based on the geolocation component,
modify the streaming content based on the location information and based on a vocal instruction received by the first audio input component and/or the second audio input component to generate modified streaming content,
the vocal instruction being isolated from noise based on comparing a signal associated with the first audio input component to a signal associated with the second audio input component, generate a destructive interference signal to cancel the noise based on the noise being received at a first intensity by the first audio input component and a second intensity by the second audio input component,
a difference between the first intensity and the second intensity being equal to or less than 10 decibels,
the vocal instruction being received at a higher intensity by the first audio input component than the second audio input component;
cause the modified streaming content to be provided via the second wireless interface; and
broadcast an indication to one or more viewing devices within a predetermined distance of the device,
the indication identifying a link for accessing the streaming content.

2. The device of claim 1, where the device is a first device; and
where the one or more processors are further to:
identify one or more second devices to which to provide the content based on the location information; and
cause the modified streaming content to be provided to the one or more second devices.

3. The device of claim 1, where the first wireless interface includes a first WiFi interface; and
where the second wireless interface includes a second WiFi interface; and
where the device further comprises a third wireless interface,
the third wireless interface including an LTE interface.

4. The device of claim 3, where the one or more processors are further to:
select one of the second wireless interface or the third wireless interface to receive or provide the modified streaming content based on one or more of:
a throughput associated with the second wireless interface or the third wireless interface, or
a cost of data associated with the second wireless interface or the third wireless interface.

5. The device of claim 1, where the one or more processors, when modifying the streaming content, are to:
obtain information regarding a location associated with the device; and
add information to the streaming content based on the location associated with the device.

6. The device of claim 1, where the indication is a message including at least one of:
an email message,
a text message, or
social media message.

7. The device of claim 1, where the one or more processors are further to:
provide the streaming content to the one or more viewing devices based on the one or more viewing devices accessing the link.

8. A method, comprising:
receiving, by a device and from a personal camera, streaming content via a first WiFi interface,
the personal camera to capture content during an activity,
the content including at least one of:
an image,
a series of images,
a video, or
audio;
receiving, by the device, a vocal instruction regarding the streaming content,
the vocal instruction being received via a first audio input component and a second audio input component of the device,
isolating, by the device, the vocal instruction from noise based on comparing a signal associated with the first audio input component to a signal associated with the second audio input component;
determining, by the device, configuration information based on which to modify or provide the streaming content,
the configuration information being determined based on one or more of:
location information associated with the device, or
the vocal instruction;
modifying, by the device, the streaming content, to obtain modified streaming content, based on the configuration information;

identifying, by the device, the noise based on the noise being received at a first intensity by the first audio input component and at a second intensity by the second audio input component,
   a difference between the first intensity and the second intensity being equal to or less than 10 decibels; and
generating a destructive interference signal, based on the noise, to cause the noise to be reduced or eliminated,
   the vocal instruction being received at a higher intensity by the first audio input component than the second audio input component;
providing, by the device, the modified streaming content via a second WiFi interface; and
broadcasting, by device, an indication to one or more viewing devices within a predetermined distance of the device,
   the indication identifying a link for accessing the streaming content.

9. The method of claim 8, further comprising:
determining that the second WiFi interface is available; and
selecting, from the second WiFi interface and a Long Term Evolution (LTE) interface of the device, the second WiFi interface to provide the modified streaming content.

10. The method of claim 8, further comprising:
providing network traffic associated with Internet activity via the second Wifi interface,
   the network traffic associated with the Internet activity including one or more of:
      streaming content from one or more other devices, or
      information associated with a location of the device.

11. The method of claim 8, further comprising:
receiving, based on the vocal instruction, information identifying the activity; and
where modifying the streaming content comprises:
   adding information relating to the activity on the streaming content,
      the information relating to the activity being relevant to a location determined based on the location information.

12. The method of claim 8, where the indication is a message including at least one of:
an email message,
a text message, or
social media message.

13. The method of claim 8, further comprising:
providing the streaming content to the one or more viewing device based on the one or more viewing devices accessing the link.

14. A non-transitory computer-readable medium storing instructions, the instructions comprising:
one or more instructions that, when executed by one or more processors of a device, cause the one or more processors to:
   receive, from a personal camera and via a first WiFi interface, streaming content,
      the personal camera to capture content during an activity,
         the content including at least one of:
            an image,
            a series of images,
            a video, or
            audio;
   receive a vocal instruction regarding the streaming content,
      the vocal instruction being received via a first audio input component and a second audio input component of the device,
   isolate the vocal instruction from noise based on comparing a signal associated with the first audio input component to a signal associated with the second audio input component;
   determine configuration information based on which to modify or provide the streaming content,
      the configuration information being determined based on one or more of:
         location information associated with the device, or
         the vocal instruction;
   modify the streaming content, to obtain modified streaming content, based on the configuration information;
   generate a destructive interference signal to cancel the noise based on the noise being received at a first intensity by the first audio input component and a second intensity by the second audio input component,
      a difference between the first intensity and the second intensity being equal to or less than 10 decibels,
      the vocal instruction being received at a higher intensity by the first audio input component than the second audio input component;
   provide the modified streaming content via a second WiFi interface; and
   broadcast an indication to one or more viewing devices within a predetermined distance of the device,
      the indication identifying a link for accessing the streaming content.

15. The non-transitory computer-readable medium of claim 14, where the first WiFi interface is associated with a different WiFi band than the second WiFi interface.

16. The non-transitory computer-readable medium of claim 14, where the one or more instructions, when executed by the one or more processors, further cause the one or more processors to:
   select one of the second WiFi interface or an LTE interface of the device on which to provide the modified streaming content; and
   where the one or more instructions, that cause the one or more processors to provide the modified streaming content via the second WiFi interface, cause the one or more processors to:
      provide the modified streaming content via the second WiFi interface based on selecting the second WiFi interface.

17. The non-transitory computer-readable medium of claim 16, where the one or more instructions, that cause the one or more processors to select the one of the second WiFi interface or the LTE interface, cause the one or more processors to:
   select the second WiFi interface or the LTE interface based on at least one of:
      a throughput associated with the second WiFi interface or the LTE interface,
      availability of the second WiFi interface, or
      a cost of data associated with the second WiFi interface or the LTE interface.

18. The non-transitory computer-readable medium of claim 14, where the one or more instructions, when executed by the one or more processors, further cause the one or more processors to:
   determine the location information based on a geolocation component of the device.

19. The non-transitory computer-readable medium of claim 18, where the one or more instructions, that cause the one or more processors to receive the vocal instruction, cause the one or more processors to:
   receive information identifying an activity to be performed by a user associated with the personal camera; and
   where the one or more instructions, that cause the one or more processors to modify the streaming content, cause the one or more processors to:
      modify the streaming content based on the location information and the information identifying the activity.

20. The non-transitory computer-readable medium of claim 14, where the indication is a message including at least one of:
   an email message,
   a text message, or
   social media message.

\* \* \* \* \*